May 2, 1961 E. R. FARBER 2,982,572
INTERLOCKING SECTIONAL UNITS
Filed Sept. 26, 1958 3 Sheets-Sheet 2
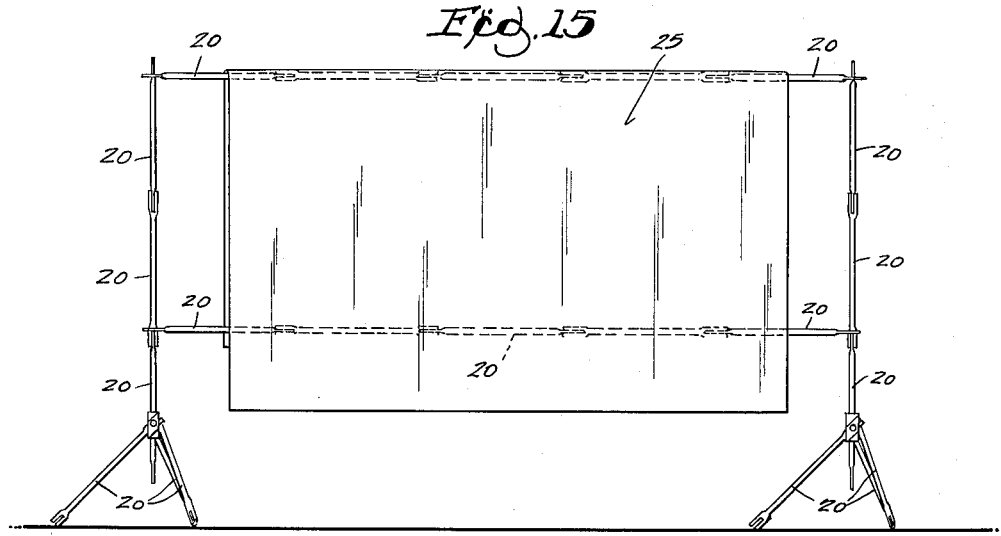
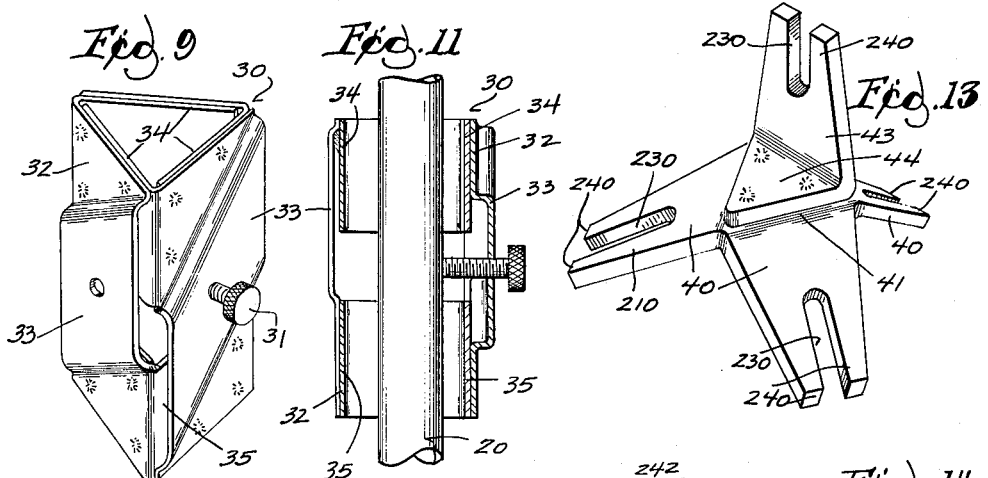
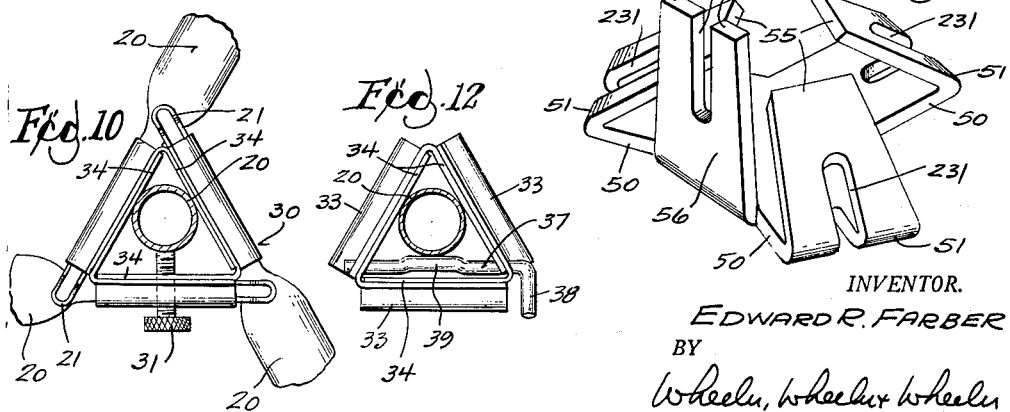
INVENTOR.
EDWARD R. FARBER
BY
Wheeler, Wheeler & Wheeler
ATTORNEYS May 2, 1961 E. R. FARBER 2,982,572
INTERLOCKING SECTIONAL UNITS
Filed Sept. 26, 1958 3 Sheets-Sheet 3
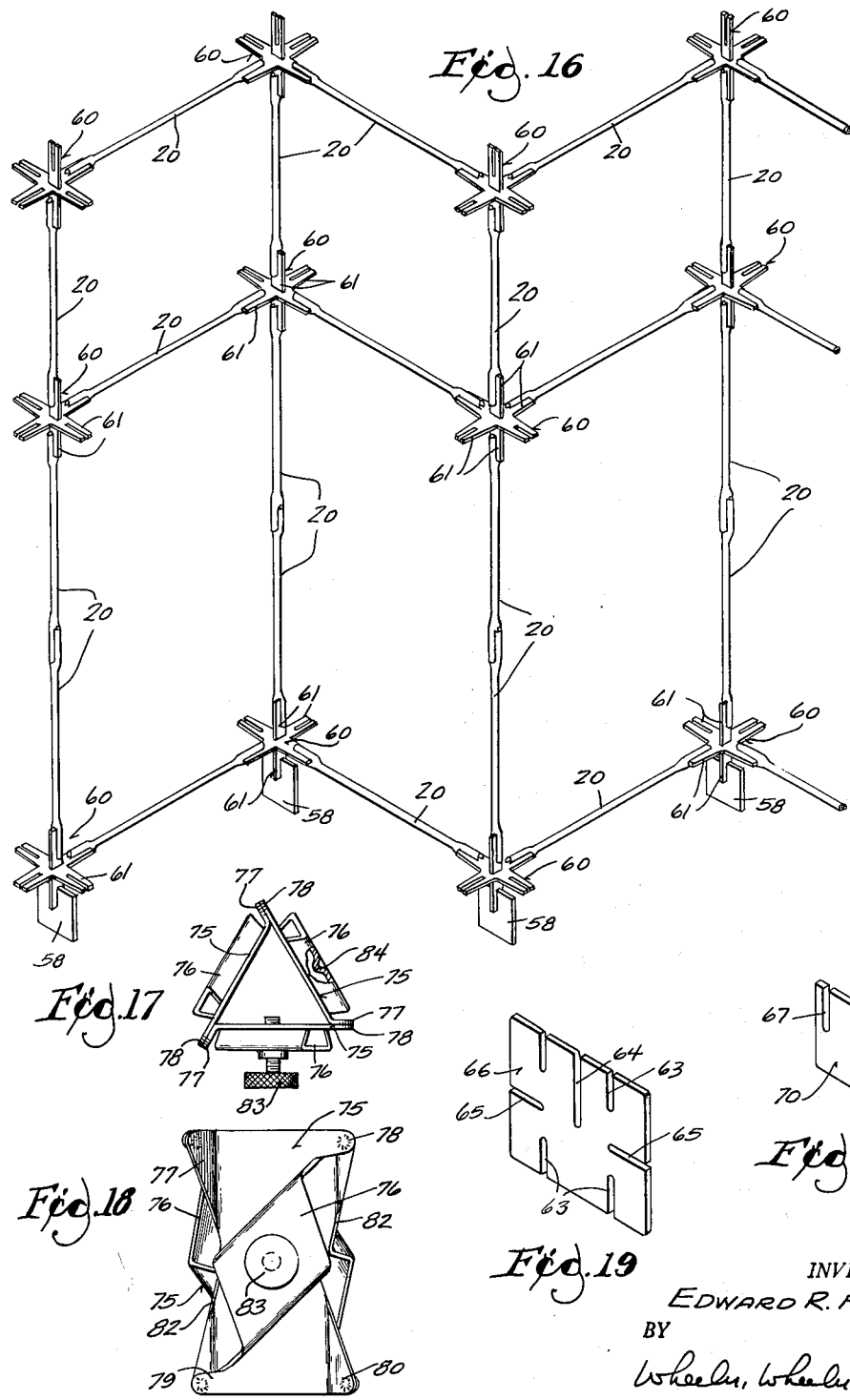
INVENTOR.
EDWARD R. FARBER
BY
Wheeler, Wheeler & Wheeler
ATTORNEYS

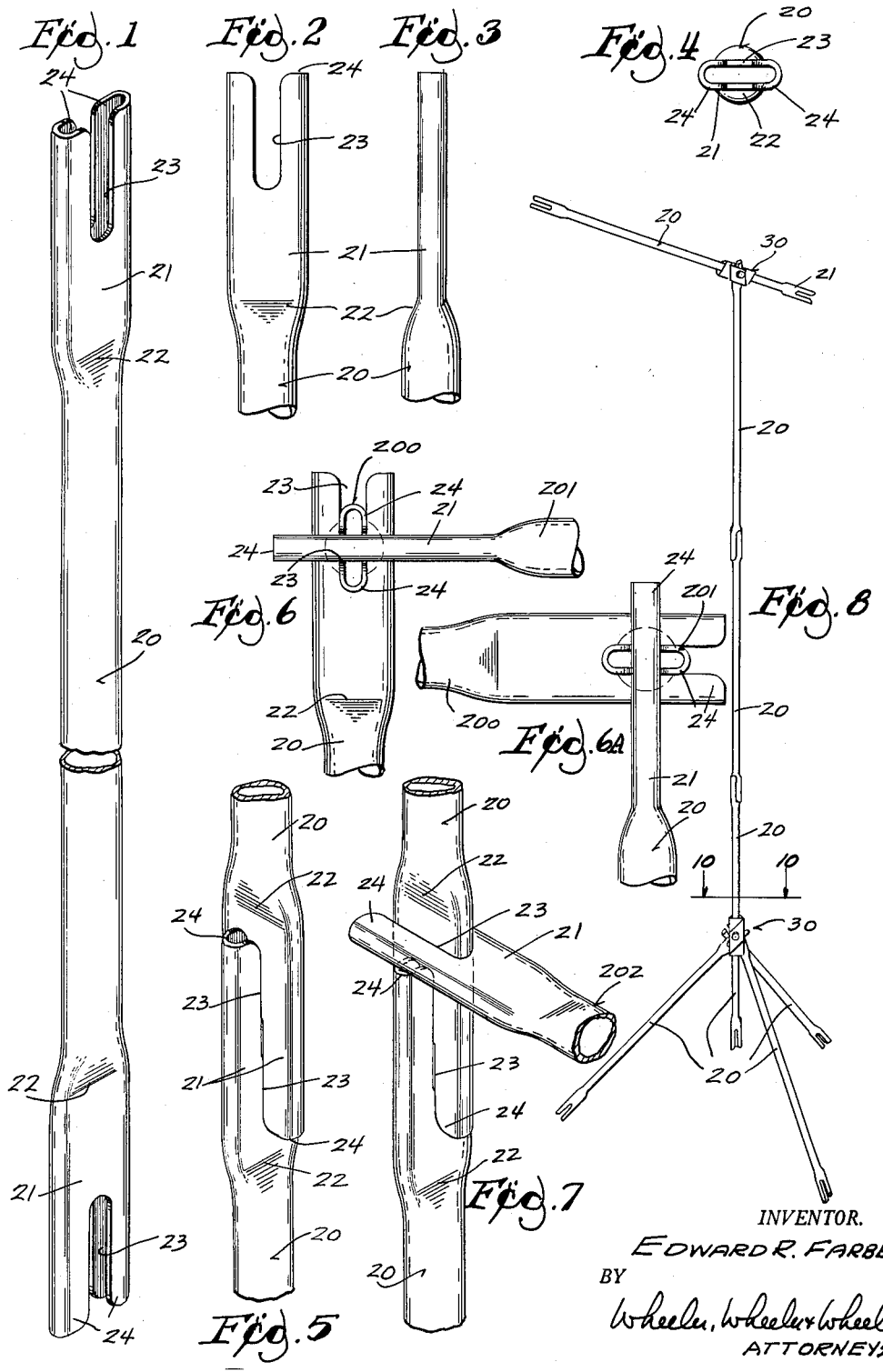

United States Patent Office 2,982,572
Patented May 2, 1961

2,982,572

INTERLOCKING SECTIONAL UNITS

Edward R. Farber, 4217 W. North Ave., Milwaukee, Wis.

Filed Sept. 26, 1958, Ser. No. 763,711

1 Claim. (Cl. 287—54)

This invention relates to interlocking sectional units of which a variety of stands, frames or scaffolds can be fabricated.

The unit parts herein disclosed can be assembled and disassembled with expedition to make and store devices of variable form and dimension and useful for a wide variety of purposes including lighting standards, advertising displays, frames, supports for trays, racks, architectural models, laboratory supports, and many others.

In order that the parts may readily be joined as well as quickly assembled and disassembled, they are desirably made of light but relatively stiff metal such as thin walled steel tubing, or aluminum, or magnesium-aluminum alloy. The major strut parts are tubular but have flattened ends which are slotted for interlock in a variety of ways either directly with each other or with brackets and clamps which are supplied as part of the kit.

In the drawings:

Fig. 1 is a detail view in perspective of a strut unit embodying the invention, portions thereof being broken away.

Fig. 2 is a fragmentary view of one end of the strut unit in front elevation.

Fig. 3 is a view of the end of the strut unit in side elevation.

Fig. 4 is a view of the end of the strut unit in plan.

Fig. 5 is a fragmentary detail view in perspective showing one manner in which the ends of two aligned strut units may be interlocked.

Fig. 6 is a fragmentary view in front elevation showing the manner in which the ends of three like strut units embodying the invention may be interlocked.

Fig. 6A is a view in side elevation of the parts shown in Fig. 6.

Fig. 7 is a view in perspective showing fragmentarily another manner in which the ends of three like strut units embodying the invention may be interlocked.

Fig. 8 is a view in side elevation of a stand constructed using the strut units of Fig. 1 together with special clamps of the type shown elsewhere herein.

Fig. 9 is a view in perspective showing the clamp used to interlock the strut units in Fig. 8.

Fig. 10 is a view on an enlarged scale taken in section on the line 10—10 of Fig. 8.

Fig. 11 is a view taken in section through the clamp of Figs. 9 and 10 fragmentarily illustrating a portion of a strut unit extending through it.

Fig. 12 is a view similar to Fig. 10 showing a slightly modified embodiment of clamp.

Fig. 13 is a view in perspective showing one embodiment of a bracket which may be used to connect the various strut units.

Fig. 14 is a view in perspective showing a modified embodiment of bracket which may be used instead of that shown in Fig. 13.

Fig. 15 is a view in elevation showing a stand which may be made using the struts and clamps herein disclosed.

Fig. 16 shows a fragmentary view in perspective of a scaffold or frame having special characteristics and made by employing the basic strut units with fittings which comprise modified embodiments of the invention.

Fig. 17 is a view similar to Fig. 10 showing in plan a modified clamp for connecting strut units in accordance with the invention.

Fig. 18 is a view in side elevation of the clamp unit shown in Fig. 17.

Figs. 19 and 20 are views in perspective showing plate fittings used to support and connect the strut units.

The strut 20 is a thin-walled tube having considerable resilience and rigidity. Both of its end portions 21 are flattened, forming rather well-defined shoulders at 22. The length of the flattened terminal portion 21 should desirably be approximately twice the width thereof. For approximately half the length, each terminal portion 21 is bifurcated by a transverse slot 23 which subdivides the end into opposing channels 24. The width of the slot is nearly equal to the thickness of the respective ends 21 so that the thickness of the end portion 21 of one of the tubular struts is receivable into the slot of another either longitudinally as shown in Fig. 5 or transversely as shown in Figs. 6 and 7.

Fig. 5 shows the two struts in alignment, rotated at 90° with respect to each other so that the unslotted terminal portion 21 of each strut is received into the slot 23 between the channel-shaped extremity 24 of the opposite strut. Parts so made and connected will not only resist separation axially of the struts but will stand considerable deflecting pressure in any other direction. As an example, Fig. 15 shows a series of the struts 20 connected together end to end as shown in Fig. 5 and extending horizontally between upright posts which are made by similarly joined vertical struts. One or both of the horizontal composite members can be used to support a substantial weight without sustaining material deflection. As an example, the display panel 25 is shown suspended from the upper of the horizontal members which connects the posts in Fig. 15.

There are a number of ways in which the ends of three struts can be interlocked. This is valuable whenever it is desired to erect a structure which has an upright post and two horizontal members meeting at a common corner. In the arrangement shown in Fig. 6 the strut 20 is upright. The slotted channel-shaped ends 24 of the horizontal strut 200 extend laterally through the slot 23 of the upright post 20 and are in turn penetrated by the channel-shaped ends 24 of the horizontal strut 201, the bifurcated channel ends 24 of which straddle the end portion 21 of the upright post and are received into the slot 23 between the channel terminal portions 24 of the horizontal strut 200 at opposite sides of the end portion 21 of the upright strut 20.

In the construction shown in Fig. 7, the aligned struts 20 are assembled exactly as in Fig. 5 but a horizontal strut 202 has its bifurcated ends 24 embracing the flattened terminal portion 21 of the upper strut 20 immediately above the ends of the channel-shaped terminal portions 24 of the lower strut 20.

Fig. 8 shows the clamp fitting 30 used at two points in a stand to provide, first of all, a tripod base for the upright struts 20 and at the upper end of the resulting column, used to support an outwardly extending strut from which a lamp or other object may be hung.

Figs. 9 to 12 show a clamp fitting which comprises a housing 30 and a setscrew 31. While the housing may be of any desired cross section, a triangular cross section has important features for the purposes of the present invention since the fitting is used to make a tripod. In the preferred form of the clamp fitting which is illustrated, the housing 30 is made of three 120° angles 32 each of which has one side embossed to provide an obliquely disposed channel at 33 and the other side slotted to provide spaced legs 34, 35. The channels may be identical even to the extent that they may all be provided with apertures threaded to receive the setscrew 31 if desired. The clearance between the legs 34 and 35 comprising the unchanneled sides of the respective angles is primarily to provide clearance for the setscrew.

The several angles can readily be assembled by spot welding as clearly shown in Fig. 9 so that the legs 34 of each angle are spot welded to the channel side of the contiguous angle to complete the housing 30. The dimensions of the channels 33 are such that these are adapted to receive the bifurcated ends 21 of any of the struts 20 and the slot 23 bifurcating the ends of the struts provides clearance for the setscrew 31 if the strut is disposed in the channel in which the setscrew is disposed.

Due to the oblique angles in which the channels 33 are formed, struts 20 engaged therein will form a tripod as shown in Fig. 15 for the support of an upright strut 20 which may be inserted into the housing 30 and secured by the setscrew 31 as shown in Figs. 10, 11 and 15. Instead of a setscrew, any other clamping device can be used. By way of example, Fig. 12 shows a rod 37 oscillatable in pierced openings in housing 30 and provided with a handle portion 38 and an offset clamping portion 39 which operates with a camming action against the side of the strut member 20 within the housing.

Where no clamping connection is required, a variety of brackets may be used to connect the various strut members. Fig. 13 shows a form of bracket which includes three mutually divergent legs 40 projecting from a central portion 41 at angles of about 120° to each other. For the particular purpose for which this bracket was designed, the legs are also bent downwardly from the horizontal at an angle of about 60°. Each bracket has a bifurcated terminal portion 210 corresponding in thickness to the terminal portion 21 of a strut and similarly bifurcated by a slot at 230 to form separate terminals 240. Any given strut may be longitudinally interlocked with one of the legs 40 in the same manner in which it is interlocked with another strut in Fig. 5.

Assuming that the fitting shown in Fig. 13 is to support an upright, a separate leg 43 may have its base portion 44 welded to the base portion 41 to project in an upright direction. Like the legs 40, the leg 43 has a bifurcating slot at 230 and may be interlocked with a strut in the manner shown in Fig. 5.

Fig. 14 shows a fitting which provides all of the requisite parts in one piece. The legs 50 have slots 231 intermediate their ends and are folded transversely upon themselves at 51. The terminal portion 55 of each of the legs 50 is unslotted but it will be observed that it corresponds to the base rather than the extremity of the flattened end portions 21 of the struts. In other words, a strut is engaged with one of the legs 50 by engaging its terminal channels 24 with the unslotted portions 55 of the respective legs 50, the unslotted portions 21 of the strut being received into the slot 231 of the respective leg.

Another leg 56, integral with legs 50, projects upwardly and has a slot 232 bifurcating it to provide separate terminal portions 242. The several struts connected with the portions 55 of legs 50 are divergent and may be used as tripod legs while the strut interlocked with the upstanding leg 56 in the manner taught in Fig. 5 will constitute a post or upright usable for any purpose.

The frame or scaffold shown in Fig. 16 may be used for a variety of purposes of which the support of advertising or photographic displays is representative. The slotted plates 58 are used as feet for the support of fittings 60 which, in this exemplification, are used throughout wherever various struts are required to be connected to each other at a variety of angles. Each fitting 60 comprises six slotted arms 61 which, in this embodiment, are at 90° or 180° with respect to each other. Each of the slotted arms may receive interlocking connection with the slotted ends of a tubular strut 20, or with one of the plates 58, or with one of the other fittings designed for such connection.

In the particular assemblage of parts shown in Fig. 16 by way of example, the frame or scaffold has an angular form in plan. Each of the several uprights is composed of two aligned struts 20 interlocking with each other, with the cross connection, and interlocked at top and bottom with the fittings 60 at which cross connection is provided. Then, above the fittings which cap the aligned struts there is a further strut 20 and a cap the top fitting 60. Each time there is a fitting 60 there is a cross connection between posts and these cross connections are fitted 90° to each other by being interlocked with contiguous arms 61 of fitting 60.

When various struts are to be connected in angular or offset relationship to each other, but all in one plane, the desired result may be achieved by any appropriate disposition of slots 63, 64, or 65 in a plate such as that shown at 66 in Fig. 19. Another possible arrangement is suggested as to slots 67, 68, 69 and plate 70 in Fig. 20.

For connecting struts in a downwardly or upwardly diverging tripod arrangement, the fitting shown in Figs. 17 and 18 may be used instead of that shown in Figs. 9 to 12. This fitting comprises three identical plates 75 formed intermediate their upper and lower ends to provide oblique transverse channels at 76 and having corner ears at 77, 78, 79 and 80 spot welded to the complementary ears of an adjacent plate. The flattened terminal portion 21 of three struts 20 can be inserted in the respective channels 76 to be confined between the channels and the side margins 82 of the contiguous plates making up the fitting. One or more setscrews 83 threaded through the channeled portion of a given plate or plates may be used to clamp a strut which passes through a hollow housing resulting from the assembly of several plates 75. Such a setscrew will be received into the slot of the flattened end portion of any strut disposed in the particular channel 76 which is provided with the setscrew. The setscrew is not required to anchor these flattened strut ends in the respective channels for the reason that a sufficiently tight anchorage is provided by the frictional engagement of the bifurcated ends of the struts in the channels. If desired, the respective channels may be embossed as shown at 84 in Fig. 17, the inwardly deformed bosses being received into the slots 23 of the flattened ends of inserted struts to limit the movement of the strut end into the socket provided by the channel.

It will be apparent a kit of struts and fittings in accordance with the present invention provides extremely versatile means for readily transporting and easily erecting and dismantling a wide variety of structures. Skeletonized frames made in accordance herewith are sufficiently sturdy to serve as a floor lamp or the like; to suspend an advertising display; to constitute a table; or to serve as the skeletonized frame of a tent. Yet the several struts are so small in cross section and light in weight that a large number of them can be carried without effort.

The basic unit of the system is, of course, the strut. The thin-walled tubing with flattened ends is greatly preferred over any other strut structure and it is found that the cut margins of the channel-shaped legs formed in the ends of the strut by the slotting operation tend to grip the coacting terminal portion of an interlocked strut more securely than would be the case if they were solid. They are resilient not only in a bodily sense but also in that pressure tends to expand their radius. Hence they interlock with an extremely tight fit and permit the use of relatively rigid metal.

I claim:

A demountable frame structure comprising three strut members having bifurcated terminal portions in mutually interlocked engagement, each such member having a flat end portion and being provided with a slot extending longitudinally approximately one-half the longitudinal distance of said flat portion to form said bifurcated terminals, the width of the slot slightly less than the thickness of the terminal portions, the bifurcated legs of each strut member forming a clamp, two of the strut members are substantially aligned and each is engaged at least in part in the slot of the other, the third such member being disposed transversely with respect to the aligned members and having its slotted end portion embracing a flattened terminal portion of another member.

References Cited in the file of this patent

UNITED STATES PATENTS

| | | | |
|---|---|---|---|
| D. 152,821 | O'Neil | Feb. 22, | 1949 |
| 1,204,329 | Wilkins | Nov. 7, | 1916 |
| 1,408,553 | Wedemann | Mar. 7, | 1922 |
| 1,448,171 | Waderlow | Mar. 13, | 1923 |
| 1,470,627 | Lampaugh | Oct. 16, | 1923 |
| 1,483,602 | Bloss et al. | Feb. 12, | 1924 |
| 1,591,110 | Willson | July 6, | 1926 |
| 1,796,353 | Williams et al. | Mar. 17, | 1931 |
| 2,218,427 | Hurlbert | Oct. 15, | 1940 |
| 2,466,148 | Birr | Apr. 5, | 1949 |
| 2,468,209 | Klein | Apr. 26, | 1949 |
| 2,475,046 | Pedersen | July 5, | 1949 |
| 2,556,839 | Cretella | June 12, | 1951 |
| 2,620,237 | Kirkpatrick | Dec. 2, | 1952 |